United States Patent [19]

Gould, Jr.

[11] Patent Number: 4,503,623

[45] Date of Patent: Mar. 12, 1985

[54] LEVEL

[76] Inventor: Edward Gould, Jr., 116 Maple Ave., Woodlynne, N.J. 08107

[21] Appl. No.: 103,722

[22] Filed: Dec. 14, 1979

[51] Int. Cl.³ ............................................. G01C 9/24
[52] U.S. Cl. ........................................ 33/379; 33/376
[58] Field of Search ................. 33/347, 350, 376, 379, 33/381, 372, 373, 384–387, 344

[56] References Cited

U.S. PATENT DOCUMENTS

| | | | |
|---|---|---|---|
| 1,393,338 | 10/1921 | Bedortha | 33/381 |
| 1,640,167 | 8/1927 | White et al. | 33/350 |
| 1,690,053 | 10/1928 | Charlton | 33/381 |
| 1,712,201 | 5/1929 | Deneen | 33/384 X |
| 1,777,429 | 10/1930 | Charlton | 33/381 |
| 2,038,531 | 4/1936 | Bassett et al. | 33/350 X |
| 2,057,404 | 10/1936 | Wahlstrom et al. | 33/376 X |
| 2,624,953 | 1/1953 | Newcomb | 33/372 |

FOREIGN PATENT DOCUMENTS 8259 of 1906 United Kingdom ................. 33/350

Primary Examiner—Charles E. Phillips
Attorney, Agent, or Firm—Duffield & Lehrer

[57] ABSTRACT

A plurality of blocks are removably held between a pair of elongated straight frame members, the majority of the blocks carrying a spirit vial therein. The frame members are held together by either a plurality of springs connected there between or by interconnection with the blocks. The arrangement of the blocks and the number thereof may be easily changed and selected at will. A pair of corner blocks may also be carried by said frame members adjacent the ends thereof.

6 Claims, 9 Drawing Figures

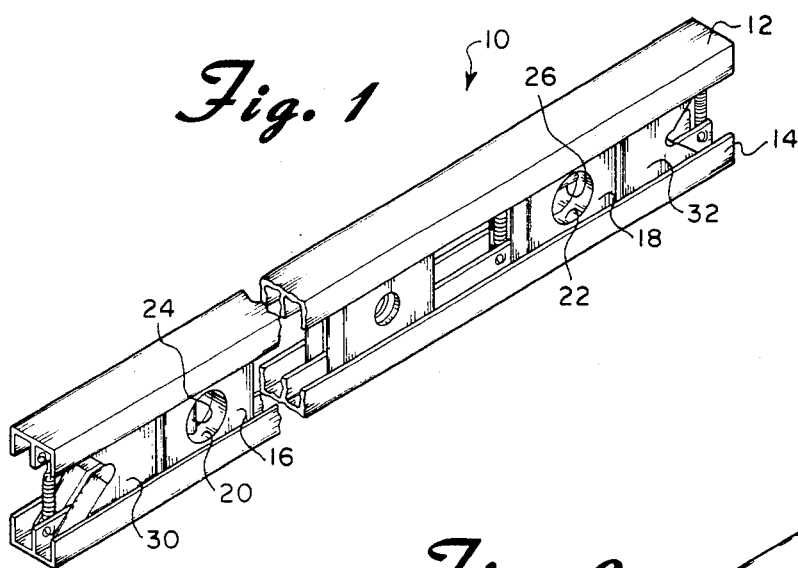
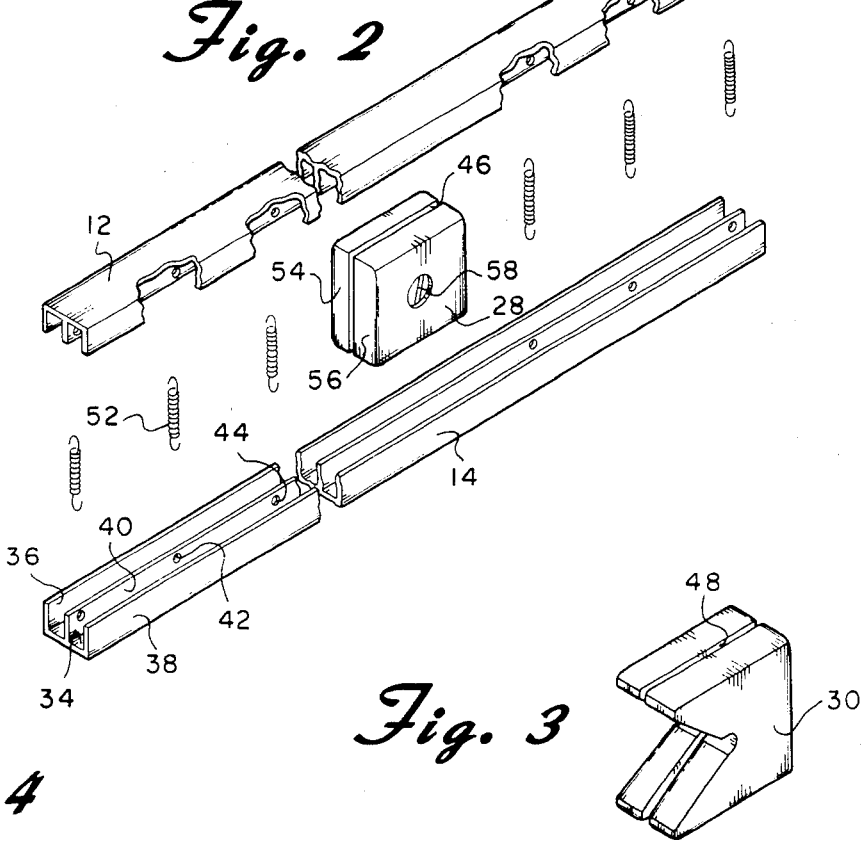
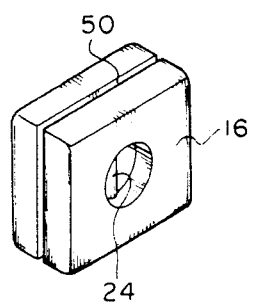
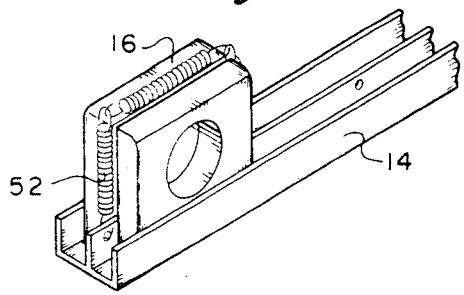

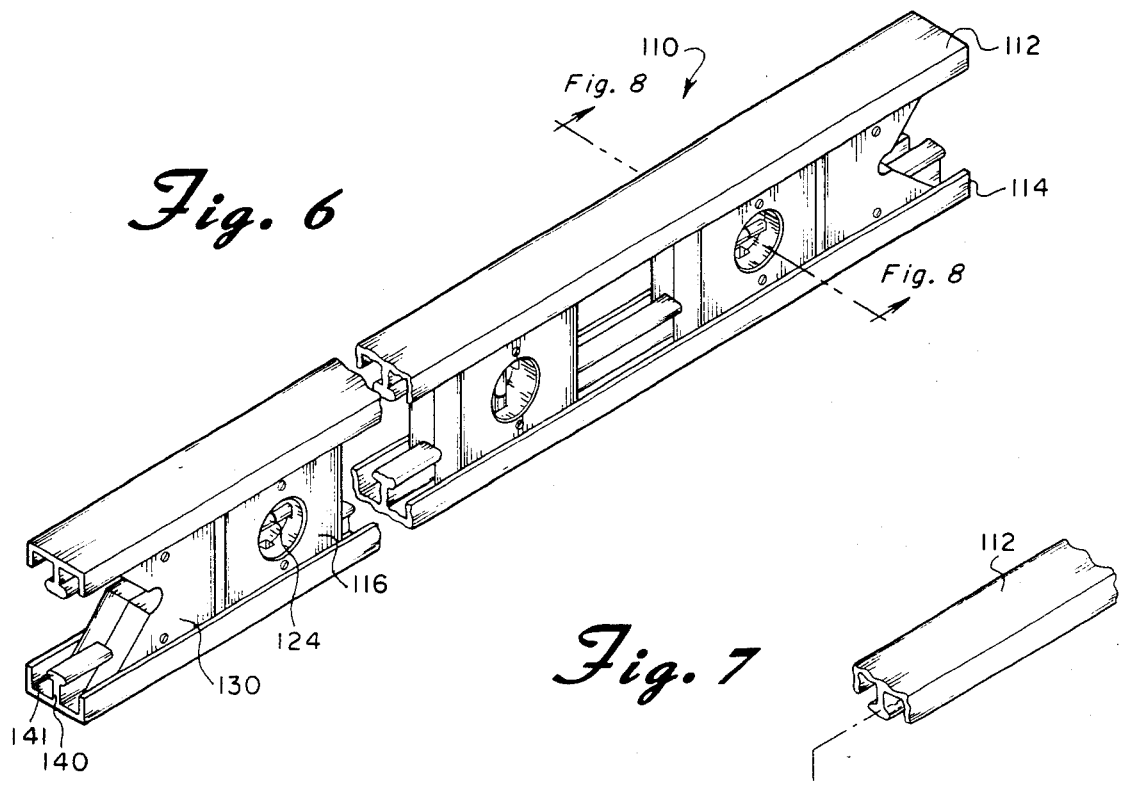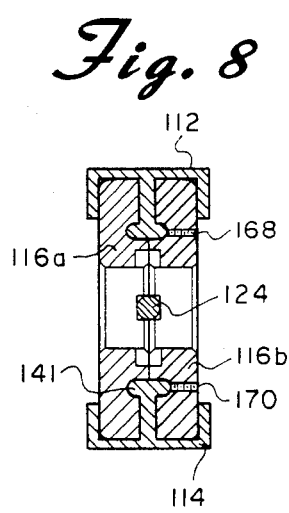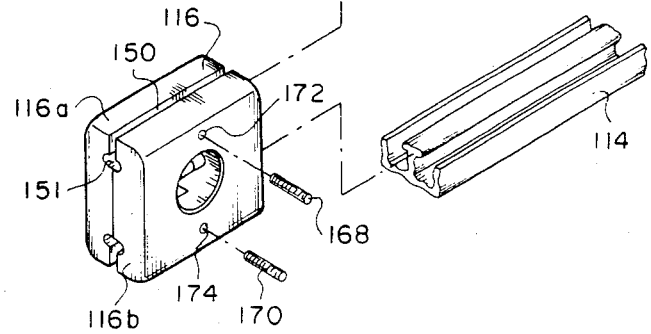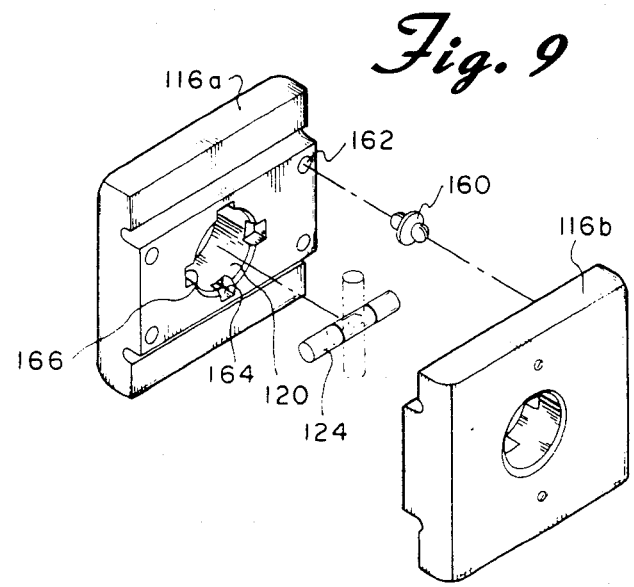

LEVEL

BACKGROUND OF THE INVENTION

The present invention is directed toward a level and more particularly toward a level wherein the blocks carrying the spirit vials can be easily replaced and/or re-arranged so that the level can be used for many purposes in many different environments.

Levels have been known and used for many years in various building trades. The main operative part of a level is a small substantially cylindrical glass vial which is substantially filled with a liquid. The cylinder is normally slightly wider at its center so as to create a high point when the same is horizontally oriented. A small bubble remaining in the cylinder will move to this midpoint when the cylinder is perfectly horizontally oriented. One or more of these vials are normally rigidly secured to an elongated frame which is placed against the work whose horizontal or vertical inclination is being checked.

In older levels, the vials were permanently secured to the frame. Since their orientation could not be changed, the level had to be used in a particular manner which often limited the user thereof. In addition, if a vial were ever broken, which frequently occurred due to the fact that they are comprised of glass, the entire level had to be replaced.

Recently, there have been proposed levels wherein the vials can be replaced and in some cases even re-oriented within the frame. However, even with these devices, the position of the vial along the frame and the number of vials which can be used is predetermined and cannot be changed. Even further, the shape of the frame itself cannot be changed thereby preventing the level from being used in certain applications.

SUMMARY OF THE INVENTION

The present invention overcomes the above-described problems of the prior art by providing a plurality of blocks which are removably held between a pair of elongated straight frame members, the majority of the blocks carrying a spirit vial therein. The frame members are held together by either a plurality of springs connected there between or by interconnection with the blocks. The arrangement of the blocks and the number thereof may be easily changed and selected at will. A pair of corner blocks may also be carried by said frame members adjacent the ends thereof.

BRIEF DESCRIPTION OF THE DRAWINGS

For the purpose of illustrating the invention, there are shown in the accompanying drawings forms which are presently preferred; it being understood that the invention is not intended to be limited to the precise arrangements and instrumentalities shown.

FIG. 1 is a perspective view of a level constructed in accordance with the principles of the present invention;

FIG. 2 is an exploded view of the device shown in FIG. 1 with several parts removed for clarity;

FIG. 3 is a perspective view showing the details of a corner block which may be used with the present invention;

FIG. 4 is a perspective view showing the details of one of the components of the invention;

FIG. 5 is a perspective view illustrating a particular application of the present invention;

FIG. 6 is a perspective view similar to FIG. 1 but showing a modified form of the invention;

FIG. 7 is an exploded view of a portion of the device shown in FIG. 6 demonstrating the manner in which the parts are interconnected;

FIG. 8 is a cross sectional view taken through the line 8—8 of FIG. 6, and

FIG. 9 is an exploded view showing the manner in which one of the blocks of the present invention is assembled.

DETAILED DESCRIPTION OF THE PREFERRED EMBODIMENTS

Referring now to the drawings in detail wherein like reference numerals have been used throughout the various figures to designate like elements, there is shown in FIG. 1 a level constructed in accordance with the principles of the present invention and designated generally as 10.

Level 10 is comprised essentially of a pair of elongated frame members 12 and 14 which are arranged parallel to each other. Located between the frame members 12 and 14 are a plurality of blocks such as shown at 16 and 18 each of which having an opening 20 or 22 therein within which is located a spirit vial 24 or 26. The spirit vials 24 and 26 are well-known in the art and accordingly it is not believed that a detailed description thereof is necessary. Preferably, however, spirit vials 24 and 26 are of the type which are substantially cylindrical but which are slightly wider adjacent the center thereof. This type of spirit vial which is well-known in the art is preferred since it functions in any horizontal position, i.e. there is no top or bottom thereto.

As shown in FIG. 1, block 16 is arranged so that spirit vial 24 is operative when the level 10 is vertically oriented. On the other hand, block 18 is arranged so that the spirit vial 26 is operative when the level 10 is in the horizontal position. As will become more readily apparent hereinafter, the arrangement of blocks 16 and 18 can be selected and changed at will. Even further, while two blocks 16 and 18 have been shown, level 10 of the present invention makes it possible to use only one block or any number thereof. The only limitation on the number of blocks which may be employed is the length of the frame members 12 and 14.

Also located between frame members 12 and 14 is a retainer block 28. The purpose of the retainer block 28 will be described below. A pair of corner blocks 30 and 32 may also be carried between the frame members 12 and 14 adjacent the ends thereof. A corner block, as is well-known in the art, is used, for example, when constructing a brick wall. After the corner of the wall is built up, the corner block is positioned thereon and a string is suspended from the corner block horizontally to assist the mason in building up the wall. The horizontal orientation of the string may be checked with a level such as level 10. These level blocks, while a necessary tool, are often misplaced. Level 10 of the present invention provides a convenient carrier for corner blocks 30 and 32 thereby making it difficult to misplace them.

As shown best in FIG. 2, frame members 12 and 14 are identical to each other. Accordingly, only one will be described in detail, it being understood that the other is similarly constructed. Each frame member, such as frame member 14, is constructed of an elongated channel element which is substantially shaped, in cross section, like a W. The channel element includes a substantially flat bottom wall 34 and a pair of upstanding side walls 36 and 38 which are substantially perpendicular to the bottom wall 34. An intermediate wall in the form of a runner 40 also extends upwardly from the bottom wall 34 approximately midway between side walls 36 and 38. A plurality of small holes such as shown at 42 and 44 are formed in the runner 40.

As can be seen in FIGS. 2, 3 and 4, each of the blocks such as retainer block 28, corner block 30 and vial holder block 16 has a groove formed in the periphery thereof. Groove 46 is shown in block 28, groove 48 in block 30 and groove 50 in block 16. These grooves are preferably formed in all four edges of the blocks and have a depth substantially equal to the height of runner 40. The width of the grooves are also substantially equal to the width of the runner 40. Thus, it can be seen that the blocks are positioned on the frame member 14 by allowing the runner 40 to fit into the grooves formed in the blocks, the side walls 36 and 38 covering the bottom edge of the front and rear of the blocks as shown in FIG. 1. It should also be readily apparent that the orientation of the spirit vial 24 of block 16, for example, can be easily changed by merely rotating block 16 90° along its edge. In other words, blocks 16 and 18 are precisely identical. One has merely been rotated 90° before being inserted into the space between frame members 12 and 14.

After the desired number of blocks are positioned in the lower frame member 14 in the desired orientation and arrangement, the lower free end of a plurality of springs 52 is passed through one of the holes such as hole 42 or 44 in the runner 40. Upper frame member 14 is then put into place in substantially the same manner as lower frame member 14 and the upper ends of each of the springs are inserted into the holes in the runner of the upper frame member 12. The tension of the springs 52 is selected so that frame members 12 and 14 are securely held together.

Preferably a relatively large number of springs 52 are employed. In this manner, one of the springs such as the one located adjacent the end of the level can be removed without affecting the remaining parts of the level. This is desirable, for example, when removing one of the corner blocks 30 or 32. In addition, springs 52 may serve to limit the linear movement of each of the blocks.

In addition to springs 52, retainer block 28 may be used to hold frame members 12 and 14 together. Retainer block 28 is preferably comprised of two half blocks 54 and 56 which are held together by screw 58. Groove 46 is therefore really the space between the half blocks 54 and 56. With retainer block 28 in place between the frame members 12 and 14, screw 58 is turned thereby bringing blocks 54 and 56 toward each other until they press tightly against either side of the runners 40 in each of the frame members 12 and 14. This securely holds frame members 12 and 14 together.

There are many times when it is desired to use a level in a relatively narrow space. This can be done with the present invention by utilizing only one of the frame members 12 or 14. When it is desired to use the device in this manner, one or more of the level blocks 16 or 18 is positioned in the conventional manner on frame member 14, for example, and is maintained thereon by a plurality of springs 52. This is shown most clearly in FIG. 5. With this arrangement, the free end of frame member 14 can be easily inserted into a relatively narrow space and the horizontal or vertical orientation can be checked by level block 16.

A second embodiment of the present invention is illustrated in FIGS. 6–9 and is designated generally as 110. Level 110 also includes a pair of elongated frame members 112 and 114. Frame members 112 and 114 are similar to frame members 12 and 14. However, runner 140 of frame member 114 has an enlarged portion 141 at the uppermost end thereof which runs the entire length of the runner 140. Runner 140 also does not have any holes therein.

Each of the blocks such as block 116 is comprised of two complementary parts 116a and 116b which are held together by a plurality of spring clips 160 located in a plurality of holes 162. The block halves 116a and 116b have portions cut away from the inner surfaces thereof such that when the two halves are properly positioned together, a groove 150 remains along two opposite edges thereof. Groove 150 is wider at the lower portion thereof such as shown at 151. It should be readily apparent that groove 150 with the enlarged portion 151 is complementary to runner 140 with its enlarged portion 141.

As is most clearly shown in FIG. 9, the cylindrically shaped spirit vial 124 may be positioned either horizontally or vertically in the opening 120 by positioning the same in either cutout portion 164 or 166. It should also be readily apparent that the vial 124 is held tightly in place when block halves 116a and 116b are joined together.

After the desired number and kinds of blocks are slid into the desired position between frame members 112 and 114, they are securely held in place by set screws 168 and 170 which pass through holes 172 and 174, respectively, in one of the block halves. Holes 172 and 174 are arranged so as to be directly opposite the enlarged portion 151 of groove 150. Thus, as shown in FIG. 8, with the blocks in place and the set screws 168 and 170 tightened, they press against the enlarged portion 141 of runner 140 to securely hold the blocks in place and to hold the frame members 112 and 114 together.

The present invention may be embodied in other specific forms without departing from the spirit or essential attributes thereof and accordingly, reference should be made to the appended claims rather than to the foregoing specification as indicating the scope of the invention.

I claim:

1. A level comprising:
    a pair of elongated substantially straight frame members;
    a plurality of blocks, each of said blocks carrying a spirit vial, said blocks being positioned between said pair of frame members, and
    a plurality of springs extending between said frame members for preventing movement of said frame members relative to each other to thereby maintain said blocks there between.

2. A level as claimed in claim 1 wherein each of said frame members has a substantially flat inside surface and includes an upstanding runner extending substantially the entire length thereof, said springs being connected to said runners.

3. A level as claimed in claim 2 wherein each of said blocks has a groove therein along opposite edges thereof, said groove being complementary to said runner whereby said runner fits within said groove.

4. A level as claimed in claim 1 wherein each of said frame members includes a pair of upstanding side walls extending substantially the entire length thereof.

5. A level as claimed in claim 1 wherein each of said blocks is comprised of two substantially identical halves fastened together.

6. A level as claimed in claim 1 further including a pair of corner blocks carried between said frame members adjacent the ends thereof.

* * * * *